3,219,110
METHOD OF CONTROLLING INCOMPETENT FORMATIONS
William L. Martin, John D. Alexander, and John N. Dew, Ponca City, Okla., assignors to Continental Oil Company, Ponca City, Okla., a corporation of Delaware
No Drawing. Filed Feb. 17, 1964, Ser. No. 345,118
6 Claims. (Cl. 166—12)

This application is a continuation-in-part of our copending application Serial No. 840,519, filed September 17, 1959, and now U.S. Patent No. 3,121,462.

This invention relates to the treatment of wells such as those producing oil or gas wherein the fluid producing formation is an unconsolidated or poorly consolidated sand or sandstone. More particularly, it is directed to an improved method of controlling such incompetent sands and preventing them from being produced along with well fluids by a method which will not cause a prohibitive reduction in the permeability of the formation. Still more particularly, it is directed to a process of consolidating or controlling incompetent formations in wells which are to be produced by a fire flood process, i.e., in situ combustion.

In the production of fluids from subterranean geological formations, difficulties are often encountered because certain of the producing formations are composed of unconsolidated sands or loosely consolidated sandstone. The presence of such unconsolidated sands in the production zone surrounding the well bore causes several types of problems in the completion and production of such wells. The production of fluids from a well which is based in such a formation frequently results in the concurrent production of sand particles which is undesirable because the unconsolidated formation fills the well bore with said particles, thus blocking the well bore and restricting the production therefrom. The damage is also extended to the pumps and surface lines of the production facilities above the well hole because of the abrasive and erosive actions of the sand grains and particles entrained in the fluids which are produced. The normal methods of production do not provide satisfactory results when applied to these sand formations and it has become necessary to develop new production methods specifically designed for such formations.

Previous efforts have heretofore been attempted for consolidating such a formation surrounding a well bore. Although certain of the methods proposed heretofore accomplish the desired sealing or cementing of the unconsolidated sands, the result is a formation that has only a slight permeability to oil or gas. The known methods of reducing sand production have all achieved a certain degree of success, but there are limitations which none of the methods have been able to overcome successfully. Furthermore, the degree of such success is more reduced when the conditions of temperature and corrosion are greater than normal. Previously used consolidating techniques have generally employed plastic binders such as phenol-formaldehyde resins, epoxy resins and the like which are injected into the formation. Such binders have the disadvantage of being limited to relatively low temperature wells. Many wells having loose sand problems are relatively high temperature wells. In addition, fluids produced in connection with in situ combustion processes often reach temperatures of 2,000° F. or higher. There exists a need for a binder material capable of withstanding high temperatures, especially the temperatures reached during production by in situ combustion techniques.

It is, therefore, a primary object of the present invention to provide a method of consolidating incompetent oil and gas formations which obviate the disadvantages of the prior art methods, especially under conditions of high temperatures, corrosion, and erosion.

Another object of our invention is to provide an improved method for consolidating loose sand formations with the maximum retention and utilization of the porosity and permeability characteristics of the sand within the formation surrounding the well bore.

A further object is to provide a method of consolidating incompetent formations resulting in a permeable mass surrounding the well bore which is essentially insoluble in and unaffected by subsequently produced high temperature well fluids.

A still further object is to provide a method for creating in wells producing from incompetent formations a permeable refractory mass which allows subsequent production of well fluids but not loose particulated formation.

Other objects and advantages of this invention will become apparent during the course of the following description.

This invention broadly relates to an improved method of consolidation capable of achieving the above objects by treating incompetent hydrocarbon producing formations to effect the placement or creation of a permeable, refractive-type consolidated zone surrounding the well bore penetrating said unconsolidated formation by placing in the well bore area and allowing to set to a hard permeable mass a relatively dry mixture of clean sand, refractory cement and water. The formation, itself, generally sand or sand mixed with clay, may be used as the source of the sand.

In old producing wells, there will often be a cavity in the well bore area created by prior production of formation sand. In newer wells, or those in which no cavity exists, it is necessary to produce such a cavity to create a space in which the mixture of refractive cement slurry and sand may be placed. The cavity may be produced by removal of a portion of the unconsolidated formation from the well bore area by conventional means, such as bailing or reverse circulation with well fluids. In a preferred method of this invention, the formation surrounding the well bore is cleaned before formation of the cavity to remove therefrom water and residual crude oils. The cleaning may be accomplished by subjecting the formation surrounding the well bore to in situ combustion or to a solvent wash.

Upon prolonged production, the well bore area of many wells is gradually reduced in permeability by the plating out therein of various finely divided solid materials carried by the produced fluids. These materials may be inorganic in nature or organic, such as paraffin, asphaltenes, etc. One feature of this invention is that further in situ combustion treatments of such plugged or partially plugged well bores may be conducted to remove the plugging materials without damage to the permeable cement plug. The heat resistant permeable refractive cement is not damaged by the temperatures reached during such in situ combustion treatments. In contrast, plugs of other cements or plastics would be severely damaged by the heat generated.

The approach to rendering the incompetent zone about the well bore devoid of all but clean unconsolidated sand grains and particles that can be easily removed is accomplished effectively by in situ combustion as known in the art. In situ combustion requires that the formation have sufficient combustible material, combustion supporting gas, and an ignition level temperature prior to initiation. This can be accomplished by any known means; such as injecting or utilizing in situ hydrocarbons; injecting air; and heating the air to the required temperature with heating means, such as downhole heater. After ignition of the hydrocarbons, the injection of a combustion supporting gas is continued to move the resultant combustion front outwardly from the well bore to the desired distance from one (1) to twenty (20) feet, preferably in the order of five (5) feet. The leading edge of the combustion front is characterized by a temperature gradient of 700° to 1,500° F./ft., which distills and cracks all liquids within the formation causing them to be driven ahead of the front. The cracking results in the deposition of a small portion of the residual hydrocarbons in the formation in the form of petroleum coke which is also combusted and removed as fuel for the front as it passes said coke.

The sand grains and particles and the pore spaces of the zone which have been subjected to the in situ combustion are thoroughly cleaned and the result is the desirable clean unconsolidated sand which is prepared for removal because the passage of said front through a zone removes all liquids and combustible material therefrom. The formation radially ahead of the point where the combustion is terminated is characterized by a zone of coke which supplies certain cohesive properties to that portion of the formation, and an oil saturated zone.

The invention herein discloses the other approach to cleaning the sand to be that of conventional solvent washout by injection and flushing to remove all material from the sand grains and particles. Solvents suitable for the dissolution and removal of hydrocarbons, such as carbon disulfide, acetone, benzene, and other aromatic solvents, are injected under pressure to move the hydrocarbonaceous material away from the well bore either to the surface or into the formation. The injection is continued until a sufficient amount of solvent is injected, whereupon air or gas is injected to cause the solvent to be evaporated or driven further into the formation.

A portion of the incompetent formation, upon being made devoid of all hydrocarbons and other liquids by either of the above approaches, is then in condition to be removed to provide space for the permeable cement. Upon completion of the step of rendering the incompetent formation devoid of undesirable matter as set forth above, the next step is to form a cavity in the well bore area (if none presently exists) capable of receiving and holding the refractory cement-sand mixture. The portion of the formation about the well bore which has been rendered even more incompetent by the cleaning effect of solvent injection or combustion consists solely of loose sand grains and particles which must be removed.

A portion of the unconsolidated sand about the well bore is removed from the well to the desired distance by conventional means such as bailing or reverse circulating with fluids such as water, air, nitrogen, etc. This removal of sand is accomplished within the formation outwardly from the well bore to establish a cavity about said well bore. The cavity may be extended to a diameter equal to the distance to which in situ combustion or solvent injection has been conducted, but in either case the outer periphery of the cavity is supported by either the coke created by the combustion or the cohesive mixture of unconsolidated formation and formation hydrocarbons. Generally a cavity having a diameter of from 1.5 to 20 feet will hold a sufficient quantity of refractory cement-sand mixture to provide a barrier of sufficient thickness to prevent subsequent loose sand production. More preferably, the cavity is from 2 to 10 feet in diameter.

After the removal of said clean sand grains and particles from about the well bore, the void of the cavity is substantially filled, by dumping or pumping therein a mixture of highly refractive cement and sand. The sand may conveniently be the same clean sand just removed from the well, but preferably is commercially available saind of a more uniform and slightly larger particle size than formation sand, generally from about 35 to about 200 mesh. The cement can be injected by normal pumping means and the sand mixed therewith is properly controlled in order that the desired features of porosity and permeability are obtained. Alternatively, the cement-sand mixture may be positioned in the well bore with a bailer. This creates a cement plug of a permeable, ceramic type in and about the well bore which is capable of withstanding severe conditions of corrosion aggravated by elevated temperatures. The porosity and permeability of the cement plug may be further increased by injecting air through the plug during the period of dehydration and setting as by placing the cement behind a slotted section of tubing. If no tubing is used, the cement plug is thereafter drilled through subsequent to sufficient setting, and production is accomplished through the remainder of the ceramic type of consolidation of this synthetic sandstone within the surrounding incompetent formation.

The consolidation of a formation using a highly refractive cement may also be utilized without the initial step of cleaning the formation with solvents or combustion, providing the formation characteristics are such that a sufficient cavity exists or can be created by conventional means without the initial removal of the naturally occurring cohesive factors.

Subsequent to the establishment of the desired consolidated zone of synthetic sandstone by the above efforts, the formation is returned to production in the normal manner as known in the art. This production will be free from the concurrent production of sand grains and particles and there will accordingly be increased production rates and economics. The previously incompetent formation is thereby rendered competent and the permeability and porosity of the predominant sand grains and particles are retained to allow production to be accomplished in an efficient and effective manner without the previous concurrent undesirable grain and particle production.

Furthermore, the method disclosed herein can be utilized indefinitely because the consolidated portion of the formation which has been created is sufficiently heat and corrosion resistant that it may be reconditioned, as necessary, by initiating in situ combustion in or near said well bore to remove any undesirable deposits which accumulate in the synthetic sandstone during subsequent production. Therefore, the formation may be maintained as a producing one for an indefinite period in this state of improved efficiency with a maximum of maintenance economy.

Heat refractory cements operable in this invention include aluminous cements and alkali metal silicate cements.

Aluminous cement, also known as high alumina or calcium aluminate cement, is a hydraulic cement which in the presence of an aqueous medium absorbs moisture and ultimately sets to a rigid mass characterized by excellent resistance to corrosion, resistance to disintegration by heat and insolubility in well fluids. Aluminous cement differs from Portland cement in that the former contains a much higher percentage of alumina than the latter. Aluminous cement is prepared from limestone and bauxite by heating a mixture of the two raw materials to a temperature that brings about a reaction between the lime and alumina, causing the formation of calcium-aluminate compounds. The materials are completely fused in the process. The resultant molten mass is drawn from the furnace, solidified by cooling, then pulverized, with or without an admixture, to a size which passes a 100-mesh Tyler screen, to produce particulate cement. Aluminous cement generally contains compounds of iron, manganese, magnesium, silicon and sodium, either present as impurities or added intentionally, in addition to the calcium aluminates which are the predominant components.

Analysis of aluminous cements generally yields the following range of composition:

| Component: | Percent (by weight) |
|---|---|
| $Al_2O_3$ | 35–80 |
| CaO | 15–45 |
| $SiO_2$ | 2–10 |
| FeO | 0–10 |
| $Fe_2O_3$ | 0–10 |
| $TiO_2$ | 0–5 |
| MgO | 0–2 |
| MnO | 0–1 |
| S | 0–1 |
| Other | 0–1 |

Alkali metal silicate cements include those containing silicates of sodium, potassium, lithium and rubidium. For practical purposes, silicates of lithium and rubidium are rare, the potassium species is used only occasionally and various sodium silicates are found in the vast majority of cements. The composition of these silicates, commonly called soluble sodium silicates, varies. Among the more common species are combination of 1 mole of $Na_2O$ with either 1, 2.1, 2.5, 3.3, or 3.9 moles $SiO_2$.

Silicate cements are made up of a soluble silicate, such as one of the sodium silicates listed above, and a filler, commonly finely particulated silica, i.e., silica flour. Other materials, such as alumina or aluminum containing clays, such as ball clay, kyanite or pyrophyllite, may be added to improve resistance of the cement to high temperatures.

In order to disclose the nature of the present invention still more clearly the following illustrative examples will be given. It is to be understood that the invention is not to be limited to the specific conditions or details set forth in these examples except insofar as such limitations are specified in the appended claims.

A series of tests were made in which mixtures of a refractory cement and clean sand were prepared, allowed to set and tested for permeability and porosity to see if a satisfactory solid permeable mass could be prepared therefrom. The results of these tests were as follows:

*Example 1*

One hundred parts by weight of an aluminous cement having the composition: 39.5% $Al_2O_3$, 36.4% CaO, 8.9% $SiO_2$, 5.7% FeO, 5.7% $Fe_2O_3$, 2% $TiO_2$, 1.1% MgO, and 0.22% S, was mixed with 100 parts water and 1,000 parts sand having a particle size which passed through a 20-mesh sieve and was retained on a 40-mesh sieve (Tyler mesh). The resulting mixture was placed in a 1-inch diameter tube 20 inches long and allowed to set for 24 hours at room temperature. At the end of this time, the solidified mass was removed from the tube and cut into ⅝-inch long cylinders. The permeability to air of representative samples was measured and found to average 3,085 millidarcys. Water was then flowed through other representative cores at the rate of 40 cc./min. for 24 hours. As there was no increase in the rate of flow after this time and no appreciable decrease in compressive strength, it was concluded that the samples were water resistant, i.e., had no appreciable solubility in water.

*Example 2*

The procedure of Example 1 was repeated except that the sand employed was Ottawa Black Hawk "E" sand. This sand was of the following particle size distribution:

| Tyler Mesh | Diameter, average (cm.) | Mass Fraction Retained |
|---|---|---|
| −35 +60 | 0.0333 | 0.024 |
| −60 +80 | 0.0212 | 0.279 |
| −80+100 | 0.0161 | 0.210 |
| −100+150 | 0.0126 | 0.266 |
| −150+170 | 0.0096 | 0.108 |
| −170+200 | 0.0081 | 0.054 |
| −200+270 | 0.0064 | 0.038 |
| −270+325 | 0.0048 | 0.018 |
| −325+400 | 0.0041 | 0.001 |
| −400 | 0.0038 | 0.002 |

Permeability of the set product averaged 1,750 millidarcys. In tests similar to those described above, this material was also found to be water resistant.

Additional tests made with this same aluminous cement established that satisfactory mixtures could be prepared using from about 5 to about 15 parts by weight aluminous cement and from about 5 to about 15 parts by weight water per 100 parts by weight sand. Such mixtures were either pumpable or could be positioned with a bailer and formed a solid matrix with satisfactory permeability.

*Examples 3 to 28*

A series of tests was made using a soluble silicate cement consisting of a sodium silicate liquid binder and a silica flour filler containing less than 1 percent alumina sold commercially as Sauereisen #31 by the Sauereisen Cements Co., Pittsburgh, Pennylvania. Various amounts of binder and filler were mixed with Ottawa Black Hawk "E" sand, placed in a cup and allowed to set for about 6 hours at room temperature. Air permeability and porosity of the set cement-sand mixture was then determined by routine methods with results as described below.

| Example No. | Filler (Parts by wt.) | Binder (Parts by wt.) | Black Hawk "E" Sand (Parts by wt.) | Permeability (md.) | Porosity (Percent Vol.) |
|---|---|---|---|---|---|
| 3 | 14.8 | 25.9 | 59.2 | 370.0 | 29.7 |
| 4 | 14.6 | 27.8 | 57.7 | 5,000.0 | — |
| 5 | 15.1 | 24.4 | 60.5 | 245.0 | — |
| 6 | 14.8 | 26.0 | 59.2 | 74.6 | — |
| 7 | 14.5 | 27.8 | 57.7 | 1,247.0 | 37.0 |
| 8 | 15.1 | 29.0 | 55.9 | 875.0 | 35.5 |
| 9 | 15.5 | 27.2 | 57.4 | 818.0 | 35.0 |
| 10 | 15.9 | 25.6 | 58.7 | 720.0 | 34.8 |
| 11 | 16.8 | 27.1 | 56.1 | 705.0 | 35.5 |
| 12 | 17.0 | 26.6 | 56.6 | 660.0 | 35.7 |
| 13 | 17.2 | 25.7 | 57.1 | 780.0 | 35.7 |
| 14 | 17.4 | 24.6 | 57.9 | 709.0 | 35.2 |
| 15 | 14.8 | 26.0 | 59.2 | 1,452.0 | — |
| 16 | 14.0 | 30.0 | 56.0 | 1,880.0 | — |
| 17 | 14.8 | 25.9 | 59.2 | 370.0 | 29.7 |
| 18 | 15.4 | 23.1 | 61.5 | 1,210.0 | 28.8 |
| 19 | 12.0 | 24.0 | 64.0 | 2,340.0 | 27.0 |
| 20 | 22.2 | 25.9 | 51.8 | 0.6 | 39.0 |
| 21 | 23.4 | 26.4 | 50.6 | 10.8 | — |
| 22 | 59.0 | 31.8 | 9.2 | 1.0 | 35.0 |
| 23 | 55.0 | 35.0 | 10.0 | 0.7 | 26.0 |
| 24 | 63.6 | 27.3 | 9.1 | 0.5 | 22.8 |
| 25 | 60.0 | 30.0 | 10.0 | 0.1 | 28.0 |
| 26 | 54.0 | 29.2 | 16.7 | 0.5 | 21.5 |
| 27 | 65.0 | 35.0 | 0.0 | <0.1 | 22.7 |
| 28 | 22.2 | 25.9 | 51.8 | 0.6 | 38.0 |

(−) Not measured.

The above data show that the product of Examples 3 through 19 had high permeability and were represented satisfactory compositions. Examples 20 through 28 gave low permeability, i.e., less than about 10 md., and were unsatisfactory. These tests also show that porosity or percent pore space is not a satisfactory measure of an operable mixture as those examples having unacceptable low permeability still had relatively high porosity. A careful study of this data shows that the most satisfactory compositions contain from 4 to 24 parts by weight filler, 15 to 34 parts binder and 51 to 70 parts sand.

Other tests with this same sodium silicate cement established that higher permeability can be achieved if the cement-sand mixture is blown with a gas, such as air or nitrogen, after being positioned but before a final set has been achieved.

*Example 29*

A well has been drilled to a depth at which the well bore exists in a producing stratum of a formation which is composed of unconsolidated and loosely packed sand. An open-ended, slotted liner is then installed in the well bore in preparation for cleaning the unconsolidated sand of the surrounding formation by the method of in situ combustion. The well bore is fitted with a bottom hole heater and in situ combustion conducted by means known in the art. The combustion process is supplemented by continuing to inject hot gases containing oxygen to accomplish the cleaning to a distance of about five feet. The well is kept clean and dry and is partially cooled by the continued injection and circulation of air in the well bore. Loose sand is then removed from the well, creating a cavity having a radius of 5 feet.

A sodium silicate cement-sand slurry is prepared using the same sodium silicate cement as in Examples 3 to 28. The slurry comprises 15 parts by weight silica flour filler, 24.4 parts sodium silicate binder and 60.5 parts clean Ottawa Black Hawk "E" sand. The cavity is then filled with this slurry using a bailer. The level of cement is depressed to the bottom of the slotted liner by applying air pressure above a conventional wiper plug. Additional air is pumped into the well for 4 hours. The well is then shut in for an additional 72 hours to allow the cement to set. Next, the well is completed in a conventional manner. When placed in production, the well produces well fluids but no particulate formation.

*Example 30*

The process of Example 29 is repeated using a different method of formation cleaning and the aluminous cement of Examples 1 and 2 as the refractory cement. The formation surrounding the well bore is cleaned by the injection therein of benzene. The cement slurry employed contains 100 parts by weight aluminous cement, 100 parts water and 1,000 parts clean Ottawa, 20–40 mesh sand. After filling the cavity with the cement slurry, the well is shut in for 72 hours to allow the cement to set. The well bore is then extended and the well completed in a conventional manner as above. This well also subsequently produces formation fluids but no formation sand particles.

It will be understood that the examples included herein are illustrative only and that the invention is to be taken as limited only by the scope of the appended claims.

We claim:

1. A method of controlling incompetent formations in wells having a high bottom hole temperature with a highly permeable and porous refractory cement comprising:
    (a) cleaning the formation to remove therefrom hydrocarbon plugging materials by in situ combustion,
    (b) forming a cavity in the well bore area by removing therefrom that portion of the formation which has been cleaned,
    (c) positioning in said cavity an aqueous slurry of sand and a highly refractive cement selected from the class consisting of:
        (i) aluminous cement, and
        (ii) alkali metal soluble silicate cement,
    (d) blowing the so-positioned slurry with a gas to increase the permeability thereof,
    (e) after the cement has set, completing the well to allow production through the cement plug.

2. The process of claim 1 wherein the so-completed well is utilized in production by in situ combustion.

3. A method of controlling incompetent formations in wells having a high bottom hole temperature with a highly permeable and porous refractory cement comprising:
    (a) cleaning the formation to remove therefrom hydrocarbon plugging materials by a liquid hydrocarbon solvent wash,
    (b) forming a cavity in the well bore area by removing therefrom that portion of the formation which has been cleaned,
    (c) positioning in said cavity an aqueous slurry of sand and a highly refractive cement selected from the class consisting of:
        (i) aluminous cement, and
        (ii) alkali metal soluble silicate cement,
    (d) blowing the so-positioned slurry with a gas to increase the permeability thereof,
    (e) after the cement has set, completing the well to allow production through the cement plug.

4. The process of claim 3 wherein the so-completed well is utilized in production by in situ combustion.

5. A method of preventing production of loose particulate formation from wells along with produced well fluids comprising:
    (a) cleaning the formation about the well bore to remove therefrom hydrocarbon plugging materials by in situ combustion,
    (b) removing from the well that portion of the incompetent formation necessary to create in the wall bore area a cavity having a diameter of from 1.5 to 20 or more feet,
    (c) positioning in said cavity a flowable aqueous slurry of a refractory cement and clean sand, said slurry being selected from the class consisting of:
        (1) from 5 to 15 parts by weight aluminous cement and from 5 to 15 parts by weight water per 100 parts by weight sand, and
        (2) from 4 to 24 parts by weight filler, from 15 to 34 parts by weight aqueous solution of an alkali metal soluble silicate binder and 51 to 70 parts by weight sand, and
    (d) after the cement has set, completing the well to allow production through the permeable cement plug.

6. A method of preventing production of loose particulate formation from wells along with produced well fluids comprising:
    (a) cleaning the formation about the well bore to remove therefrom hydrocarbon plugging materials by a liquid hydrocarbon wash,
    (b) removing from the well that portion of the incompetent formation necessary to create in the well bore area a cavity having a diameter of from 1.5 to 20 or more feet,
    (c) positioning in said cavity a flowable aqueous slurry of a refractory cement and clean sand, said slurry being selected from the class consisting of:
        (1) from 5 to 15 parts by weight aluminous cement and from 5 to 15 parts by weight water per 100 parts by weight sand, and
        (2) from 4 to 24 parts by weight filler, from 15 to 34 parts by weight aqueous solution of an alkali metal soluble silicate binder and 51 to 70 parts by weight sand, and
    (d) after the cement has set, completing the well to allow production through the permeable cement plug.

(References on following page)

References Cited by the Examiner

UNITED STATES PATENTS

| | | | |
|---|---|---|---|
| 2,193,808 | 3/1940 | Dieterich | 166—12 |
| 2,240,622 | 5/1941 | Lawson | 166—12 |
| 2,288,556 | 6/1942 | Vollmer | 166—12 |
| 2,288,557 | 6/1942 | Vollmer | 166—12 |
| 2,378,817 | 6/1945 | Wrightsman et al. | 166—33 |
| 2,699,832 | 1/1955 | Allen | 166—44 XR |
| 2,771,952 | 11/1956 | Simm | 166—12 |
| 2,786,531 | 3/1957 | Mangold et al. | 166—12 |
| 3,044,546 | 7/1962 | Dixon | 166—11 |
| 3,044,550 | 7/1962 | Eilers | 166—42.1 |
| 3,070,159 | 12/1962 | Marx | 166—11 |

CHARLES E. O'CONNELL, *Primary Examiner.*

BENJAMIN HERSH, *Examiner.*